(12) United States Patent
Goettfert et al.

(10) Patent No.: US 8,060,757 B2
(45) Date of Patent: *Nov. 15, 2011

(54) DECRYPTION AND ENCRYPTION DURING WRITE ACCESSES TO A MEMORY (75) Inventors: Rainer Goettfert, Taufkirchen (DE); Erwin Hess, Ottobrunn (DE); Bernd Meyer, Munich (DE); Steffen Sonnekalb, Taufkirchen (DE)

(73) Assignee: Infineon Technologies AG (DE)

( * ) Notice: Subject to any disclaimer, the term of this patent is extended or adjusted under 35 U.S.C. 154(b) by 1286 days.

This patent is subject to a terminal disclaimer.

(21) Appl. No.: 11/395,486

(22) Filed: Mar. 30, 2006

(65) Prior Publication Data
US 2007/0192592 A1    Aug. 16, 2007

Related U.S. Application Data (63) Continuation of application No. PCT/EP2004/009274, filed on Aug. 18, 2004.

(30) Foreign Application Priority Data

Sep. 30, 2003  (DE) .................. 103 45 385

(51) Int. Cl.
G06F 11/30 (2006.01)
H04L 9/00 (2006.01)

(52) U.S. Cl. ........................ 713/193; 380/264

(58) Field of Classification Search .............. 713/162, 713/190, 194, 189, 193; 380/264, 44–47
See application file for complete search history.

(56) References Cited

U.S. PATENT DOCUMENTS

| 6,345,359 | B1 * | 2/2002 | Bianco ................. 713/190 |
| 2002/0073326 | A1 | 6/2002 | Fontijn | |
| 2003/0046563 | A1 * | 3/2003 | Ma et al. ................ 713/190 |

FOREIGN PATENT DOCUMENTS

EP    0 455 064 B1    7/1996

OTHER PUBLICATIONS

Menezes, Alfred; Van Oorschot, Paul C. and Vanstone A. Scott: "CBC mode" Handbook of Applied Cryptography, Press, NY, pp. 228-231, 1997.
Alfred J. Menezes, et al., "Handbook of Applied Cryptography", Chapter 7, pp. 223-282.
Bruce Schneier, "Encrypting Data for Storage," Chapter 10—Using Algorithms, XP-2002309006, pp. 220-222.

* cited by examiner

Primary Examiner — Nasser Moazzami
Assistant Examiner — Trong Nguyen
(74) Attorney, Agent, or Firm — Dickstein Shapiro LLP (57) ABSTRACT An encryption part or a decryption part of an encryption/decryption apparatus or a part common to both parts is used both for encryption and decryption of a datum to be stored and the encrypted memory content and for the generation of the address-individual key and the address-dependent key, respectively.

16 Claims, 5 Drawing Sheets

DECRYPTION AND ENCRYPTION DURING WRITE ACCESSES TO A MEMORY

CROSS-REFERENCE TO RELATED APPLICATION

This application is a continuation of co-pending International Application No. PCT/EP2004/009274, filed Aug. 18, 2004, which designated the United States and was not published in English and is incorporated herein by reference in its entirety.

BACKGROUND OF THE INVENTION

1. Field of the Invention

The present invention relates to the decryption and encryption during write accesses to a memory, as it is used for securing data with chip cards or smart cards, for example.

2. Description of the Related Art

For protection against unauthorized spying out stored information, in various applications, the memory contents of the memory are encrypted. In the field of cashless payments, for example, amounts of money are stored on chip cards in encrypted manner, to protect it from unauthorized spying out or from manipulation, such as unauthorized amount changes.

An unauthorized person acquires the plain text underlying the encrypted information stored in the memory by statistical analysis of the cipher text stored on the memory, for example. This statistical analysis, for example, includes an analysis of the probability of occurrence of certain cipher text data blocks or the like. In order to make this statistical analysis more difficult, it is desirable that the same plain texts located at different memory positions of the memory in encrypted form are not present there in form of identical cipher text texts.

One possibility to ensure the encryption of plain texts at different memory positions into different cipher texts is to use the so-called cipher block chaining method for encryption, i.e. operating a block cipher in the CBC mode, as it is described in the Handbook of Applied Cryptography, CRC Press, NY, 1997, page 230, for example. In the CBC mode, the cipher text of the preceding plain text data block, such as the plain text data block with an address in the memory lower by 1 or higher by 1, is always employed for encryption of a plain text data block. The CBC mode has the disadvantage that an individual isolated datum in the memory can only be decrypted when the entire or at least part of the chain of the sequential data is decrypted. As a result, no direct access to data within the CBC chain is possible. Going through the cipher chain again costs valuable computation time and consumes unnecessarily much current, which is of disadvantage particularly with smart cards used in battery-operated devices, such as mobile phones, or with chip cards in which the customers of the chip card issuers demand as-short-as-possible transaction times at the terminals.

Another possibility to ensure that the same clear texts located at different memory positions are encrypted into different cipher texts is the generation of address-dependent keys for encrypting the plain texts. The use of address-dependent keys takes advantage of the fact that a fixed memory space, and thus a fixedly associated address, is associated with a datum to be stored and to be encrypted, and that the encrypted, stored datum is and remains stored exactly at this fixedly associated address until it is again read out on the basis of this address. From a present secret master key and the address information for a memory position or an individually addressable unit, an individual key with which the datum concerned can be encrypted in a write process and decrypted in a read process may now be generated.

Figure 4:
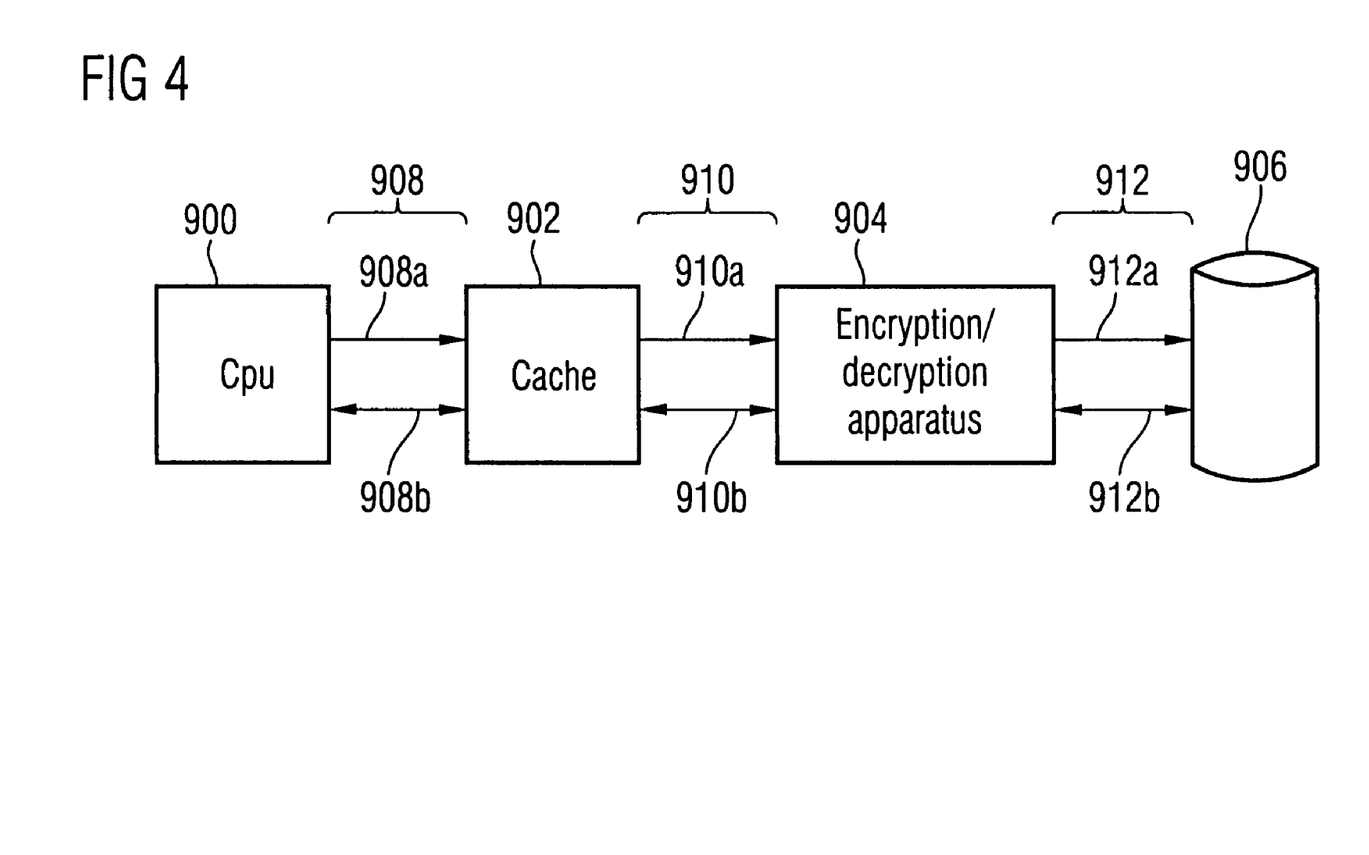
FIG. 4 shows an arrangement of CPU and memory as an example for a memory system with encrypted storage.
Figure 5:
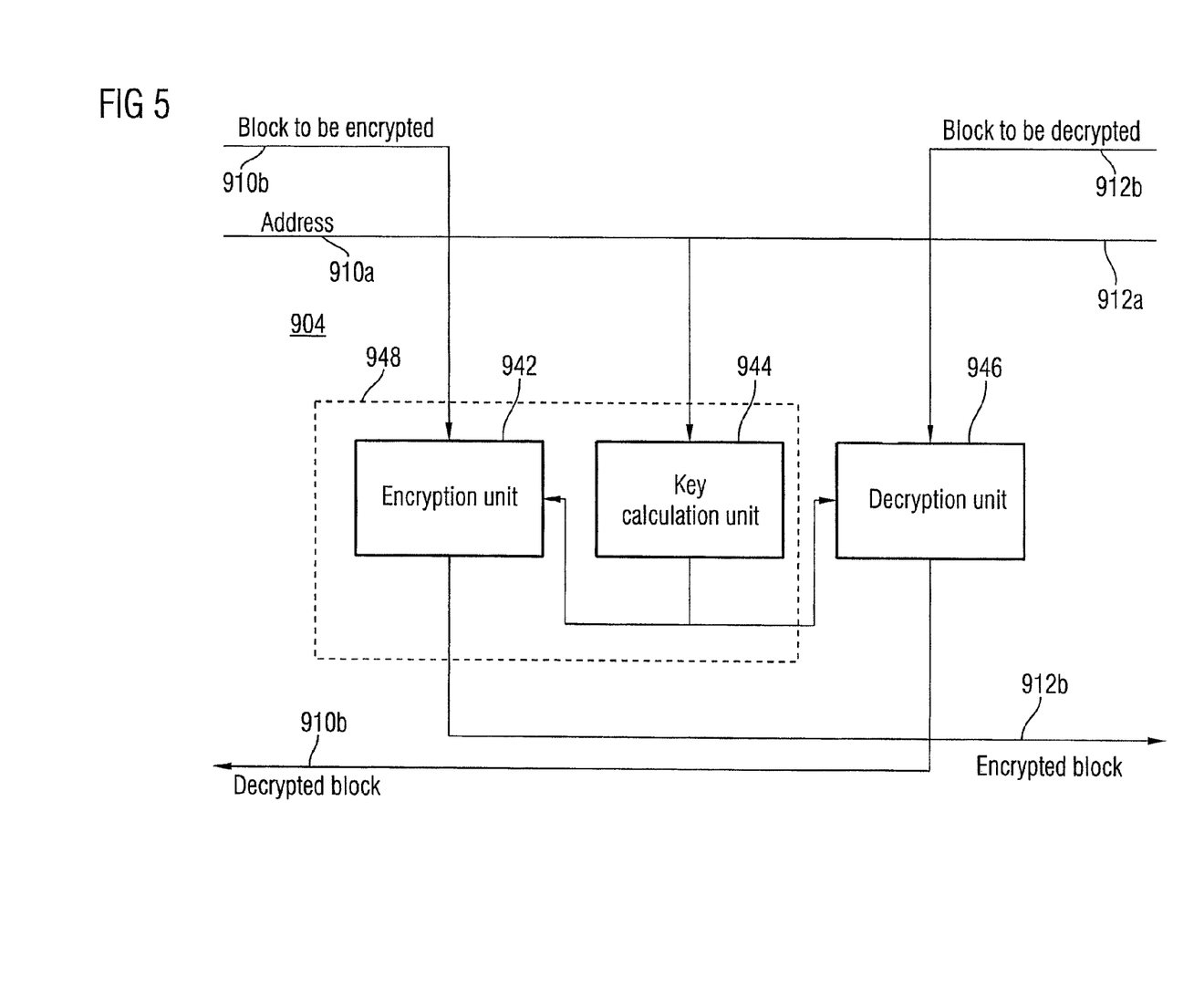
FIG. 5 is a circuit diagram of a conventional possibility for address-dependent encryption of memory contents.

On the basis of FIGS. 4 and 5, a previously possible construction of systems with address-dependent encryption, as it could be implemented previously, is described. FIG. 4 shows the rough construction of an arrangement with memory encryption. The arrangement includes a CPU 900, a cache memory 902, an encryption/decryption apparatus 904, and a memory 906. CPU 900 and cache 902 are connected to each other via a bus 908. The bus 908 includes an address bus 908a and a data bus 908b. Likewise, the cache 902 and the encryption/decryption apparatus 904 are connected to each other via a bus 910, which again consists of an address bus 910a and a data bus 910b, whereas the encryption/decryption apparatus 904 and the memory 906 are connected to each other via a bus 912 consisting of an address bus 912a and a data bus 912b.

In a write access, the CPU 900 now at first sends the ad-dress at which a datum is to be stored to the cache memory 902 via the address bus 908a. From there, the address proceeds further to the encryption/decryption apparatus 904, which again generates the address-individual key from the address, via the address bus 910a. The CPU 900 outputs the datum to be stored in unencrypted manner to the cache memory 902 on the data bus 908b. The cache memory 902 enters the pair of address and data to be stored, displacing another address/datum pair, and forwards the datum to be stored to the encryption/decryption apparatus 904. This encrypts the datum to be stored according to the address-individual key and outputs the cipher text for physical storage to the memory 906 via the data bus 912b.

In the read process, the CPU 900 outputs the address to the cache memory 902 via the address bus 908a. It at first looks up whether the current memory content of this address is present in the cache memory. In case of a cache miss, the address proceeds further to the encryption/decryption apparatus 904 via the address bus 910a. From the address, it in turn generates the address-individual key and outputs the address to the memory 906 via the address line 912a. The memory 906 returns the memory content of this address to the encryption/decryption apparatus 904 as a response, which in turn converts the cipher text read out from the memory 906 to plain text data on the basis of the address-individual key and outputs the same to the cache memory 902 via the data bus 910b. The cache memory 902 then updates its entries by displacement of another address/datum pair and outputs the decrypted plain text datum to the CPU 900 via the data bus 908b.

FIG. 5 illustrates the encryption/decryption apparatus 904 of FIG. 4 in greater detail. As can be seen, the encryption/decryption apparatus 904 includes an encryption unit 942, a key calculation module 944, and a decryption unit 946. The encryption unit 942 is provided to receive the blocks to be stored during store processes and to output encrypted blocks via the data bus 912b. Similarly, the decryption unit 946 is provided to receive blocks to be decrypted from the memory via the data bus 912b and to forward the same as decrypted blocks in the direction of CPU or cache via the data bus 910b. The key calculation module 944 is connected to the address busses 910a and 912a, which form a uniform address bus, as can be seen in FIG. 5. The key calculation module 904 is provided both during write and read processes, in order to convert the address on the address bus 910a or 912a to the address-individual key and output the same to a key input of the encryption unit 942 and the decryption unit 946, which in turn use this key for encryption and decryption themselves, respectively.

With the dashed line in FIG. 5, the encryption part 948 of the encryption/decryption apparatus 904 is again highlighted.

As can be seen, the same includes the encryption unit 942 and the key calculation module 944. Each is in charge of a special task in the encryption, the encryption unit 942 for the encryption of the data block to be stored, and the key calculation module 944 for the generation of the address-individual key. Encryption unit 942 and key calculation module 944 each consist of hardware of their own, which is also different from the hardware of the decryption unit 946. Hence, address and block to be stored pass through physically different data paths in the encryption part 948, so as to obtain the address-individual key and the encrypted data block therefrom, respectively. Viewing the decryption part in isolated manner of course yields the like.

It is disadvantageous in the possibility of realization according to FIG. 5 that enormous hardware effort is required for memory backup. Hence, it would be desirable to have an encryption/decryption scheme for backed-up storage of data, which is less hardware-intensive in its realization or implementation. With chip cards and smart cards in particular, any saving in chip area does pay off extraordinarily, since these items are mass-produced items.

US 2002/0073326 A1 refers to the protection of stored data, using the memory address as an encryption key. As encryption key, the physical address, the logical address, or any other address depending on one of the two addresses in causal and predictable manner may be used.

EP 0 455 064 B1 is different from memory systems in which the stored data is protected using the memory address and undertakes protection of the stored data by providing, based on the data address of a datum to be stored or stored, at first a key address, which then points to a datum serving as an encryption key for the encryption of the datum to be stored or stored. According to a special embodiment, it is described that the provision of the key address takes place by setting bits of the data address to 0, whereupon the key address is used to generate an encryption key bit which is then subject to bit-wise XNORing with the byte stored in the data register. Furthermore, it is described that the generation of the encryption key byte takes place while the actual encryption of the datum from the data register is performed in an encryption circuit separate herefrom.

SUMMARY OF THE INVENTION

The present invention provides an encryption/decryption scheme for memory accesses so that the implementation is more effective.

In accordance with a first aspect, the present invention provides an apparatus for encrypting a datum to be stored during a write access to a memory at an access address into an encrypted datum, having: a cryptographic module for generating an address-dependent key from the access address and for encrypting the datum to be stored with the address-dependent key, wherein the cryptographic module has a cryptographic calculating unit with a data input, a key input, and a data output for performing a cryptographic algorithm on data at the data input and key input, to output a cryptographic result at the data output; and a controller for controlling the cryptographic module, such that in a first phase the access address passes through the cryptographic module in a first data path into which the cryptographic calculating unit is connected with data input and data output, and a master key is present at the key input of the cryptographic calculating unit in the first phase when the access address passes through the cryptographic calculating unit, in order to obtain the address-dependent key at the end of the first phase, and in the second phase the datum to be stored passes through a second data path into which the cryptographic calculating unit is connected with data input and data output, and the address-dependent key is present at the key input of the cryptographic calculating unit in the second phase when the datum to be stored passes through the cryptographic calculating unit, so that the datum to be stored is obtained at the end of the second phase.

In accordance with a second aspect, the present invention provides an apparatus for decrypting a memory content during a read access to a memory at an access address into a decrypted datum, having: a cryptographic module for generating an address-dependent key from the access address and for decrypting the memory content with the address-dependent key, wherein the cryptographic module has a cryptographic calculating unit with a data input, a key input, and a data output for performing a cryptographic algorithm on data at the data input and key input, to output a cryptographic result at the data output; and a controller for controlling the cryptographic module, such that in a first phase the access address passes through the cryptographic module in a first data path into which the cryptographic calculating unit is connected with data input and data output, and a master key is present at the key input of the cryptographic calculating unit in the first phase when the access address passes through the cryptographic calculating unit, in order to obtain the address-dependent key at the end of the first phase, and in the second phase the memory content passes through a second path into which the cryptographic calculating unit is connected with data input and data output, and the address-dependent key is present at the key input of the cryptographic calculating unit in the second phase when the memory content passes through the cryptographic calculating unit, so that the decrypted datum is obtained at the end of the second phase.

In accordance with a third aspect, the present invention provides a method of encrypting a datum to be stored during a write access to a memory at a memory address into an encrypted datum by means of a cryptographic module for generating an address-dependent key from the access address and for encrypting the datum to be stored with the address-dependent key, wherein the cryptographic module has a cryptographic calculating unit with a data input, a key input, and a data output for performing a cryptographic algorithm on data at the data input and key input, to output a cryptographic result at the data output, wherein the method has the steps of: controlling the cryptographic module, such that in a first phase the access address passes through the cryptographic module in a first data path into which the cryptographic calculating unit is connected with data input and data output, and a master key is present at the key input of the cryptographic calculating unit in the first phase when the access address passes through the cryptographic calculating unit, in order to obtain the address-dependent key at the end of the first phase; and controlling the cryptographic module, such that in a second phase the datum to be stored passes through a second data path into which the cryptographic calculating unit is connected with data input and data output, and the address-dependent key is present at the key input of the cryptographic calculating unit in the second phase when the datum to be stored passes through the cryptographic calculating unit, so that the datum to be stored is obtained at the end of the second phase.

In accordance with a fourth aspect, the present invention provides method of decrypting a memory content during a read access to a memory at an access address into a decrypted datum by means of a cryptographic module for generating an address-dependent key from the access address and for decrypting the memory content with the address-dependent key, wherein the cryptographic module has a data input, a key input, and a data output for performing a cryptographic algorithm on data at the data input and key input, to output a cryptographic result at the data output, wherein the method has the steps of: controlling the cryptographic module, such that in a first phase the access address passes through the cryptographic module in a first data path into which the cryptographic calculating unit is connected with data input and data output, and a master key is present at the key input of the cryptographic calculating unit in the first phase when the access address passes through the cryptographic calculating unit, in order to obtain the address-dependent key at the end of the first phase; and controlling the cryptographic module, such that in a second phase the memory content passes through a second path into which the cryptographic calculating unit is connected with data input and data output, and the address-dependent key is present at the key input of the cryptographic calculating unit in the second phase when the memory content passes through the cryptographic calculating unit, so that the decrypted datum is obtained at the end of the second phase.

In accordance with a fifth aspect, the present invention provides a computer program with program code for performing, when the computer program is executed on a computer, the method of encrypting a datum to be stored during a write access to a memory at a memory address into an encrypted datum by means of a cryptographic module for generating an address-dependent key from the access address and for encrypting the datum to be stored with the address-dependent key, wherein the cryptographic module has a cryptographic calculating unit with a data input, a key input, and a data output for performing a cryptographic algorithm on data at the data input and key input, to output a cryptographic result at the data output, wherein the method has the steps of: controlling the cryptographic module, such that in a first phase the access address passes through the cryptographic module in a first data path into which the cryptographic calculating unit is connected with data input and data output, and a master key is present at the key input of the cryptographic calculating unit in the first phase when the access address passes through the cryptographic calculating unit, in order to obtain the address-dependent key at the end of the first phase; and controlling the cryptographic module, such that in a second phase the datum to be stored passes through a second data path into which the cryptographic calculating unit is connected with data input and data output, and the address-dependent key is present at the key input of the cryptographic calculating unit in the second phase when the datum to be stored passes through the cryptographic calculating unit, so that the datum to be stored is obtained at the end of the second phase.

In accordance with a sixth aspect, the present invention provides a computer program with program code for performing, when the computer program is executed on a computer, the method of decrypting a memory content during a read access to a memory at an access address into a decrypted datum by means of a cryptographic module for generating an address-dependent key from the access address and for decrypting the memory content with the address-dependent key, wherein the cryptographic module has a data input, a key input, and a data output for performing a cryptographic algorithm on data at the data input and key input, to output a cryptographic result at the data output, wherein the method has the steps of: controlling the cryptographic module, such that in a first phase the access address passes through the cryptographic module in a first data path into which the cryptographic calculating unit is connected with data input and data output, and a master key is present at the key input of the cryptographic calculating unit in the first phase when the access address passes through the cryptographic calculating unit, in order to obtain the address-dependent key at the end of the first phase; and controlling the cryptographic module, such that in a second phase the memory content passes through a second path into which the cryptographic calculating unit is connected with data input and data output, and the address-dependent key is present at the key input of the cryptographic calculating unit in the second phase when the memory content passes through the cryptographic calculating unit, so that the decrypted datum is obtained at the end of the second phase.

It is the finding of the present invention that either the encryption part or the decryption part of an encryption/decryption apparatus or a part common to both parts may be used both for encryption and decryption of the datum to be stored or the encrypted memory content and for the generation of the address-individual key or the address-dependent key, whereby the implementation effort regarding the chip area is reduced, without substantially increasing the latency time for memory accesses in most bus systems.

For example, in an address phase of a bus passing between cipher domain, i.e. memory side, and plain text domain, i.e. CPU or cache side, the encryption part of an encryption/decryption apparatus 904 may be used to generate the address-dependent key from the address of the memory access by encrypting the address with a master key. In the write or read phase of the bus following the address phase, the same hardware, i.e. the encryption unit, may then be used for actual encryption of the data to be stored, wherein the address-dependent key generated in the address phase is used as the key.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Before particular embodiments for the present invention will be described subsequently with reference to the figures, it is pointed out that identical or similar elements in the figures are provided with identical or similar reference numerals there, and that repeated description of these elements is omitted.

Figure 1:
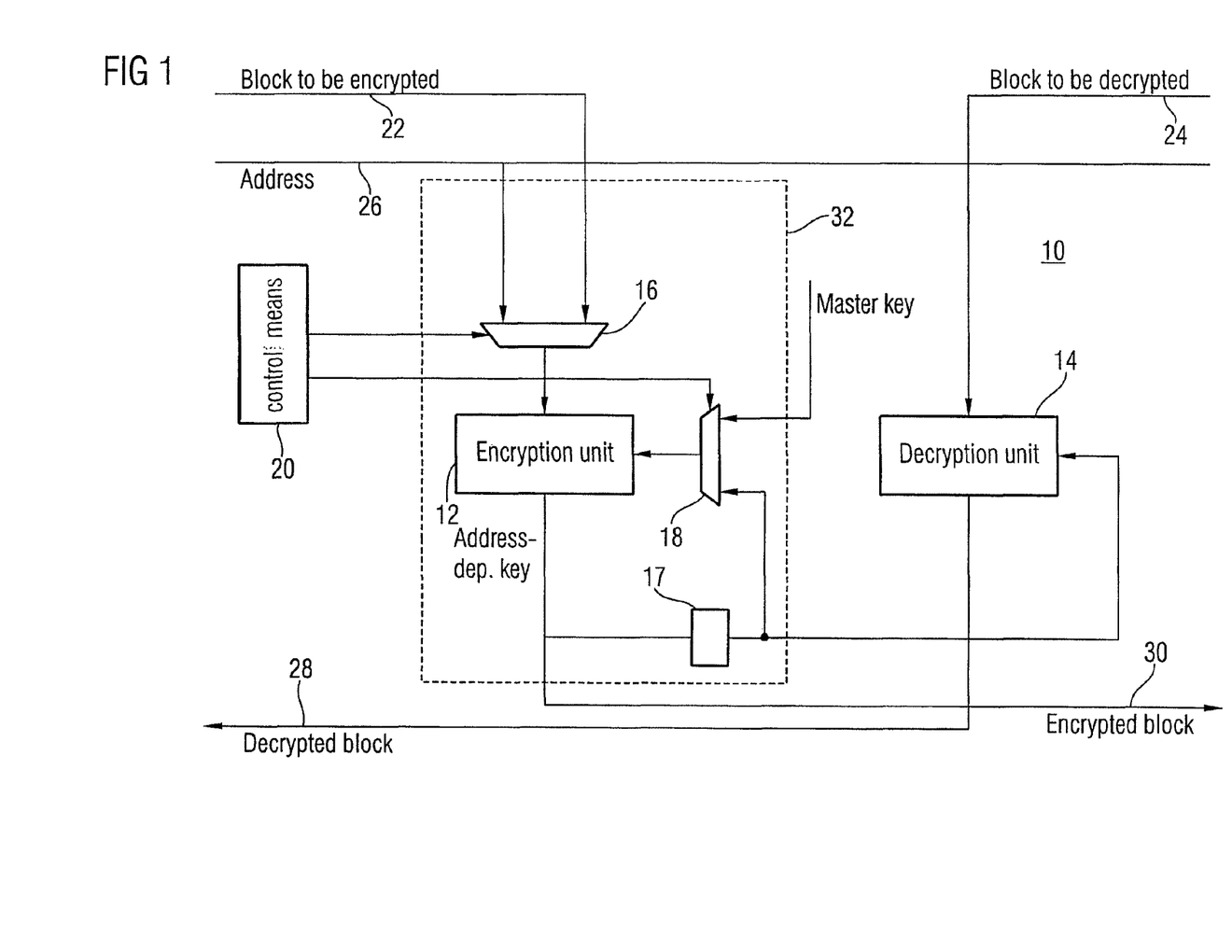
FIG. 1 is a circuit diagram of an encryption/decryption apparatus according to an embodiment of the present invention.

FIG. 1 shows an embodiment of an encryption/decryption apparatus with an encryption part in which a single cryptographic calculating unit is used both for the generation of the address-dependent key and for the encryption of data to be encrypted.

The encryption/decryption apparatus of FIG. 1, generally indicated at 10, may be used as encryption/decryption apparatus 904 in the memory system of FIG. 4, for example. It includes a cryptographic calculating unit 12 as encryption unit, a cryptographic calculation unit 14 as decryption unit, a data input multiplexer 16, a key register 17, a key input multiplexer 18, and a control means 20. The entire encryption/decryption apparatus includes three inputs and two outputs, specifically an input 22 for the reception of blocks to be stored, an input 24 for the reception of blocks to be decrypted, an input 26 for the reception of an access address, an output 28 for outputting decrypted blocks, and an output 30 for outputting encrypted data blocks. A first data input of the multiplexer 16 is connected to the input 26, to obtain the access address, whereas a second data input of the multiplexer 16 is connected to the input 22, to obtain data blocks to be stored. A data output of the multiplexer 16 is connected to a data input of the encryption unit 12. At a first data input of the multiplexer 18, a master key or general key is present, which is for example fixedly stored in an accompanying memory (not shown). A second data input of the multiplexer 18 is connected to a register output of the register 17, the register input of which is in turn connected to a data output of the encryption unit 12. A data output of the multiplexer 18 is connected to a key input of the encryption unit 12. Both multiplexers 16 and 18 comprise control inputs that are in turn connected to control outputs of the control unit 20. The data output of the encryption unit 12 is at the same time connected to the data output 30 of the encryption/decryption apparatus 10. On the decryption side, the decryption unit 14 is connected between input 24 and output 28 with data input and data output. A key input of the decryption unit 14 is also connected to the register output of the key register 17. Data input 22 and address input 26 are connected to a bus on which address phases precede write phases, and the access address is at first transferred in address phases and then the block to be stored in the write phase. Correspondingly, data input 24 and address input 26 are also connected to a bus on which address phases precede read phases, and the access address is at first transferred in address phases and then the cipher text block to be read in the read phase. Both buses may be regarded as one bus the data bus part of which is interrupted by the encryption/decryption apparatus 10 as interface between cipher and plain text domain and continues at the data outputs 28 and 30.

After having previously described the construction of the apparatus of FIG. 1, its functioning will be described in the following. At first, a store process is to be considered. During a store process, the encryption/decryption apparatus 10 is supposed to encrypt a data block to be stored, which is present in plain text at the input 22 and originates from a CPU via a bus, for example, into an encrypted block and then output it at the data output 30 for physical storage in cipher format. So that the memory target for the block to be stored is also known on the reception side at the data input 22, the access address referring to the desired memory location is also transmitted on the bus and reaches the address input 26. The pair of address and block to be stored is, however, transmitted in temporarily offset manner on the bus during a read process. In particular, the access address for the memory access is at first transmitted in an address phase of the bus. Hereupon, the transfer of the block to be stored, which thus arrives later, follows in a writing phase. Consequently, of an address/data pair, the access address arrives earlier at the address input 26 during a write access than the data to be stored and to be encrypted at the data input 22.

When the access address arrives at the address input 26, the control unit 20, knowing that a write access is present, controls the multiplexer 16 in this address phase such that it connects the data input connected to the address input 26 to the multiplexer output, or the data input of the encryption unit 12. During the address phase, the control unit controls the multiplexer 18 such that it forwards the master key to the key input of the encryption unit 12. The control unit effects the control of the multiplexers 16 and 18 via control signals to the control inputs of the multiplexer 16 and 18. The control of the multiplexers 16 and 18 in the manner described causes the memory address to pass through a data path leading from the address input 26 via the multiplexer 16, the encryption unit 12, to the key register 17 in the address phase, so as to then be available for forwarding to the key input of the encryption unit 12 via the multiplexer 18, as it will be described in the following. The master key is present at the key input of the encryption unit 12, while the address here passes through the encryption unit 12. In the end, this means that the access address is encrypted with the master key in the address phase of the bus (not shown) connected to the inputs 22 and 26.

The encryption unit 12 is a DES module or another block cipher module, for example. The address 26 may be provided to the encryption unit 12 in modified form if the encryption unit 12 is a data block mapping that expects the data blocks with a greater bit length than the bit length of the address at the address input 26. In this case, the address 26 may for example be supplemented by zeros or ones as LSBs (least significant bits) or MSBs (most significant bits), or the address is supplied twice, in order to achieve an input block at the encryption unit 12 with double the amount of bits. From the address in the address phase, the encryption unit 12 therefore generates an address-dependent key latched in the register 17 at the end of the data path in the address phase, so as to be present a the second data input of the multiplexer 18 from the register output in the subsequent bus cycle, because the datum to be encrypted arrives on the bus.

In the write phase following the address phase, the block to be stored is present at the second data input of the multiplexer 16. In this phase, the control unit 20 controls the multiplexer 16 such that it forwards the block to be stored to the data input of the encryption unit 12, and the multiplexer 18 such that it now does not forward the master key but the address-dependent key generated in the address phase and ready in the register 17 to the key input of the encryption unit 12. In the write phase, the block to be stored thus takes a data path leading to the output 30 via the multiplexer 16 and the encryption unit 12, wherein the address-dependent key generated in the address phase is present at the key input of the encryption unit 12 while the block to be stored passes through the encryption unit 12. Hereby, the block to be stored is encrypted with the address-dependent key by the encryption unit 12 in the writing phase, whereby the encrypted block results at the output 30.

From the preceding description, it becomes obvious that both the address and the block to be stored take data paths both leading through the encryption unit 12 in the encryption part of the encryption/decryption apparatus 10 indicated with a dashed line 32 in FIG. 1. Hence, both for the key generation and for the actual encryption, the same hardware is used, namely the calculating unit for the encryption unit 12. A specially provided calculating unit for the calculating of the address-dependent key is not provided or not necessary. The time overhead by the serial use of the encryption unit 12 for both the key generation and the actual encryption is limited, since address and block to be stored arrive in addressing phase and ensuing write phase, respectively, temporally offset anyway.

In a decryption process, the encryption/decryption apparatus 10 behaves in slightly different manner. In this case, the control unit 20 controls the multiplexer 16 and the multiplexer 18 in the same way as in the address phase during a write process, i.e. guiding the address to the data input of the encryption unit 12 and the master key to the key input. Thus, the address arriving first in the address phase is encrypted first by the encryption unit 12 so as to obtain the address-dependent key, whereupon the block to be decrypted and arriving later in the reading phase is decrypted at the decryption unit with the use of the address-dependent key ready in the register 17, in order to output the decrypted block at the output 28.

Figure 2:
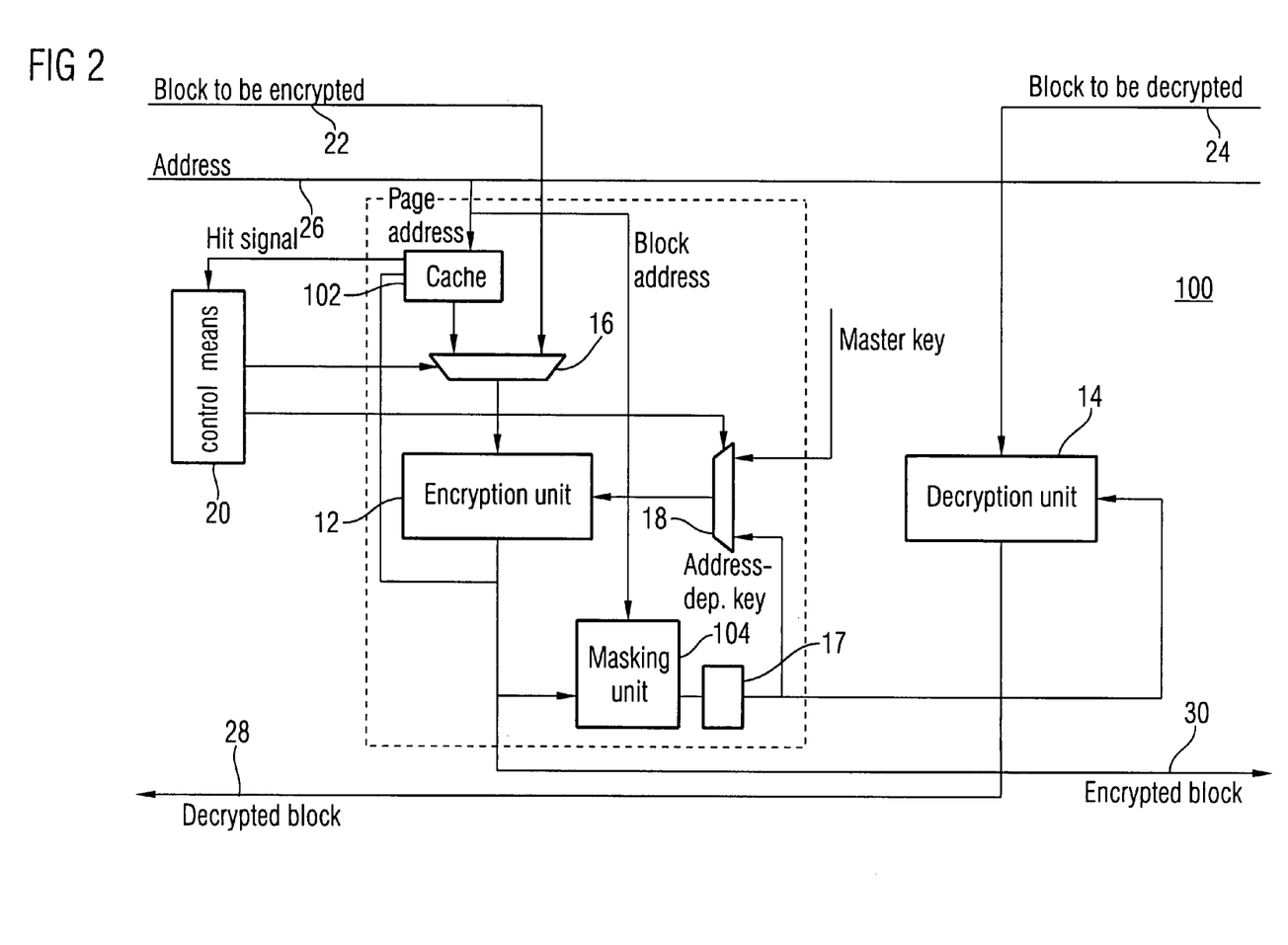
FIG. 2 is a circuit diagram of an encryption/decryption apparatus according to a further embodiment of the present invention.

The embodiment of FIG. 1 has clearly shown the utility to use encryption unit 12 both for key generation and actual encryption. Key generation is here performed with each storage and read process. Key generation phase and encryption or decryption phase thus are about equally long in the apparatus of FIG. 1. FIG. 2 shows an embodiment for an encryption/decryption apparatus in which this effort is reduced in two respects. First, not the entire address of the block to be stored, i.e. the unique address, is used for key generation by the encryption unit. Rather, the address is divided into a page address and a block address, and the address-dependent keys are only assigned page-wise and generated from the page addresses. The block address is used to be able to encrypt the blocks of a page with different address-dependent keys, these however differing from each other only by a masking of an underlying page key, which is relatively easy to implement.

Furthermore, it is generally attempted to avoid the complicated key generation by the encryption unit as often as possible by using a cache memory to keep one or more current page keys ready for quick access.

The encryption/decryption apparatus of FIG. 2 generally indicated at 100 includes, apart from the units of the apparatus of FIG. 1, a page key cache memory 102 and a masking unit 104. The cache memory 102 includes a data input, a data forwarding output, a hit data output, and a hit signal output. The data input of the cache memory 102 is connected to the address-input 26, to obtain the page address part of the unique address at the address input 26. For example, this presently is the 16 MSBs (most significant bits) of a unique 18-bit address at the address input 26. The data forwarding output of the cache memory 102 is connected to the multiplexer 16. It is provided to forward the page address at the data input in case of a cache miss. Like the data output of the encryption unit 12, the hit data output is connected to a data input of the masking unit 14 as well as to the data output 30. The hit signal output of the cache memory is connected to a signal input of the control means 20. A further data input of the masking unit 104 is connected to the address input 26, to receive thereat the block address of the unique address at the address input 26, i.e. following the present exemplary example, the two LSBs (least significant bits) of the unique 18-bit address. A data output of the masking unit 104 is connected to the register input of the key register 17. The remaining terminals of the units are identical to those of FIG. 1.

Figure 3:
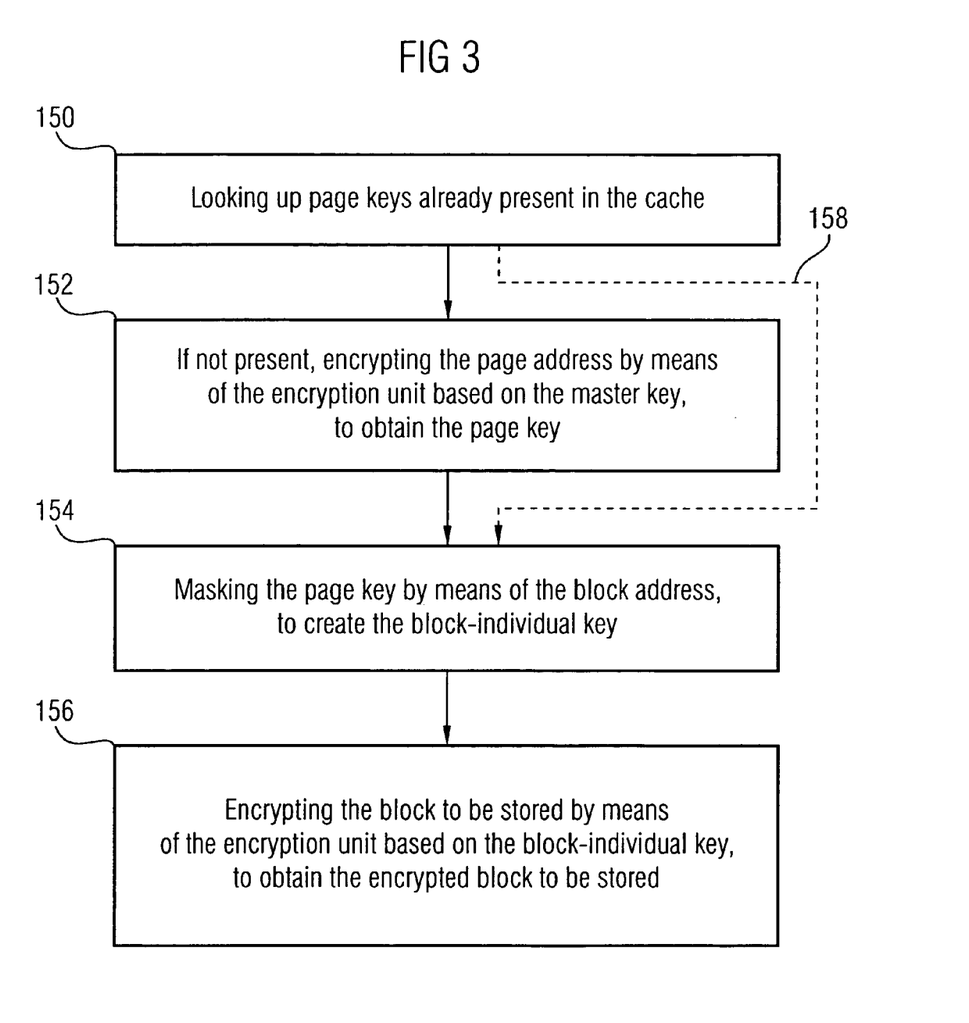
FIG. 3 is a flow chart for illustrating the processing steps in the apparatus according to FIG. 2.

The functioning of the apparatus 100 of FIG. 2 will be described with reference to FIG. 3, wherein it is assumed that the datum to be stored is $(k_0, k_1, k_2, \ldots k_{31})$ and the accompanying memory address $(a_0, a_1, a_2, \ldots a_{17})$, with $k_{31}$ and $a_{17}$ as the LSB each, $k_0$ and $a_0$ as the MSB each, and $k_i$ and $a_j \in \{0,1\}$ and $i=0 \ldots 31$ and $j=0 \ldots 17$.

As already mentioned, the memory address is at first present at the input 26 in an address phase. From this memory address, the page address part consisting of the 16 MSBs, i.e. $(a_0, a_1, a_2, \ldots a_{15})$ gets to the cache memory 102. In a step 150, it is now looked up in the cache memory 102 if a page-individual key for the page address sought is therein. The cache memory 102 includes a list of pairs of page address and accompanying page-address-dependent key. In case of a cache miss, the cache memory 102 forwards the page address to the first data input of the multiplexer 16. In response hereto, the control means 20 controls the multiplexers 16 and 18 in the address phase of the bus connected to the inputs 26 and 22 in a step 152 like in the case of FIG. 1, i.e. such that the multiplexer 16 connects the data forwarding output of the cache 102 to the data input of the encryption unit 12, and that the multiplexer 18 applies the master key to the key input of the encryption unit 12. Consequently, in the step 152, in case of a cache miss, the forwarded page address is encrypted by means of the encryption unit 12 based on the master key, whereby a page key is obtained. The newly calculated page key is of course also entered into the cache memory 102 for update, which comprises a certain displacement strategy, such as the FIFO (first in first out), in which the first-in page address/page key pair is displaced, or the LRU (least recently used) principle, in which the least recently used one or that accessed least recently is displaced. Instead of a cache memory, also a simple register may be used, which only contains the last calculated page key for a page address.

The encryption unit 12 implements a non-linear mapping of a 32-bit block to a 32-bit block. Since the page bit address is, however, only 16 bits long, it is spread prior to the input into the encryption unit 12, such as by supplying $(a_0, a_1, a_2, \ldots a_{15}, 0, 0, \ldots, 0)$, $(a_0, a_0, a_1, a_1, \ldots, a_{14}, a_{14}, a_{15}, a_{15})$, or $(a_0, a_1, a_2, \ldots, a_{15}, a_0, a_1, a_2, \ldots, a_{15})$ to the data input of the encryption unit 12. The calculated page key resulting in step 152 is 32 bits long and given by $(s_0, s_1, s_2, \ldots, s_{31})$.

The page key present at the input of the masking unit 104 is masked in a step 154 with the block address, i.e. the two LSBs of the memory address or $(a_{16}, a_{17})$ by simple bit linkage or bit-wise linkage among the bits of the block address and the bits of the page key, such as by mapping the page key to $(s_0 \oplus a_{16}, s_1 \oplus a_{17}, s_2 \oplus a_{16}, s_3 \oplus a_{17}, \ldots, s_{31} \oplus a_{17})$, which then represents the address-dependent key output at the output of the masking unit 104, which is at first latched in the key register 17, so as to be present at the second data input of the multiplexer 18 on arrival of the block to be encrypted in the next bus cycle.

When the datum to be stored is present at the input 22 in the write phase of the bus following later, the control means 20 controls the multiplexers 16 and 18 like in the example of FIG. 1, i.e. such that the multiplexer 16 forwards the datum to be stored to the data input and the multiplexer 18 the address-dependent key to the key input of the encryption unit 12. Hereby, in a step 156, the datum to be stored is encrypted by means of the address-dependent key calculated in the address phase, whereby the encrypted datum is obtained and output at the output 30.

With reference to the preceding functional description within the scope of a write access, the following is pointed out. In the description of FIG. 3, a pair of 16-bit address and 32-bit datum was mentioned. But it is also possible that more than only one 32-bit datum to be stored is encrypted in the write phase. The 18-bit address for example uniquely defines a memory region including four 32-bit data units. These four units could then be encrypted with the same address-dependent key after each other in the write phase by passing them through the encryption unit 12 in the write phase.

An advantage achieved by the split of the 18-bit address into a 16-bit page address part and a 2-bit block address part is that the four data blocks belonging to one page uniquely identified by the page address are all encrypted on the basis of the same page key—a process that is relatively time-consuming. Nevertheless, the four blocks of one page are not encrypted with the same key. After all, the page key is masked with the block-individual block address by the masking unit 104 for each block. But this process is comparably simple and easy. For example, if blocks of one page are written after each other within one page, there is a page key already calculated in the cache memory 102 in step 150 in the write processes following the first write process in the cache memory 102 for the page address, which is indeed identical for all blocks of one page. For this reason, the encryption of the page address by the encryption unit 12 may in this case be bypassed, which the cache memory 102 realizes by outputting the stored key already calculated via the hit data output to the data input of the masking unit 104. The intensive encryption step of step 152 may thus be skipped, which is hinted at by a dashed line in FIG. 3, indicated by 158. By a hit signal, the cache memory 102 indicates to the control means 20 that a cache hit has occurred, which information the control means 20 may use to start the encryption of the arriving datum to be stored as early as possible in the write phase or perform other control changes. Consequently, by providing the cache memory 102, the latency times during memory accesses are reduced. The masking by the block address prevents the use of the same address-dependent key for all blocks of one page with little overhead at the same time.

During read processes, the apparatus 100 of FIG. 2—similarly as also the apparatus of FIG. 1—acts in analog manner to the functioning during write processes, namely with the difference that the processing of the data in the reading phase executes at the decryption unit and not at the encryption unit. Apart from that, the steps 150-158 are correspondingly applicable also to the read process, wherein, as also valid for FIG. 1, the control means constantly controls the multiplexers 16 and 18, both in address and read phase, in read processes such that they forward or apply cache forwarding output with data input and master key to key input of encryption unit 12.

The previously described embodiments solve the problem of the higher software effort in address-dependent key generation described in the introductory section of the description by a two-stage concept adapted to the special features of the bus timing. In the addressing phase of the bus, the hardware module 10 or 100 is utilized for generating the encryption key. Before the word to be encrypted or to be decrypted is available, a region key, which is subsequently used for the encryption (or decryption) of the word, is then generated from the memory address of the word and from a secret universal key or master key. This region key thus is the encryption key. When the word is present, it is encrypted or decrypted by the same hardware module by applying the region key. The use of the same hardware for the region key generation and for the encryption/decryption reduces the area need of the module considerably (roughly halving the area). The word-serial block-wise encryption or decryption of the memory contents with the region key determined in the first step takes place "on the fly" directly during the write or read phase of the bus. The previous embodiments may easily be integrated in standard bus systems.

The previous embodiments had in common that one and the same piece of hardware thereof, namely the encryption unit in the embodiments of FIGS. 1 and 2, was at the same time used for the generation of the encryption key and for the encryption. Of course, it would also be possible to use the same piece of hardware at the same time for the generation of the encryption key and for the decryption. The unsymmetrical construction, namely the use of either the encryption or the decryption part for the generation of the address-dependent key or a part thereof, may also be cancelled. The encryption/decryption apparatus may include a cryptographic module for generating the address-dependent key from the access address and for encrypting the datum to be stored or decrypting the memory content with the address-dependent key, wherein at least one cryptographic calculating unit or a hardware of the cryptographic module is used for both tasks, i.e. for both encryption and decryption on the one hand and key generation on the other hand.

In particular, it is pointed out that, depending on the conditions, the inventive scheme for encryption/decryption may also be implemented in software. The implementation may take place on a digital storage medium, particularly a floppy disk or CD with electronically readable control signals capable of interacting with a programmable computer system, so that the corresponding method is executed. In general, the invention thus also consists in a computer program product with program code stored on a machine-readable carrier for performing the inventive method, when the computer program product is executed on a computer. In other words, the invention may thus be realized as a computer program with program code for performing the method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for encrypting a datum to be stored during a write access to a memory at an access address into an encrypted datum, comprising:
    a cryptographic module configured for generating an address-dependent key from the access address and configured for encrypting the datum to be stored using the address-dependent key, wherein the cryptographic module includes a cryptographic calculating unit with a data input, a key input, and a data output, configured for performing a cryptographic algorithm on data at the data input and key input, to output a cryptographic result at the data output; and
    a controller configured for controlling the cryptographic module, such that in a first phase the access address passes through the cryptographic module in a first data path into which said data input and said data output of the cryptographic calculating unit are connected, and a master key is present at the key input of the cryptographic calculating unit in the first phase when the access address passes through the cryptographic calculating unit, in order to obtain the address-dependent key at an end of the first phase, and in the second phase the datum to be stored passes through a second data path into which said data input and said data output of the cryptographic calculating unit are connected, and the address-dependent key is present at the key input of the cryptographic calculating unit in the second phase when the datum to be stored passes through the cryptographic calculating unit, so that the encrypted datum is obtained at an end of the second phase,
    wherein at least one of the cryptographic module and the controller comprises a hardware implementation.

2. The apparatus of claim 1, wherein the apparatus is coupled to a data/address bus so as to obtain the access address and a memory content therefrom, wherein the data/ address bus is designed to transmit the access address and the memory content, in a temporally offset manner and in this order.

3. The apparatus of claim 1, further comprising:
a multiplexer with a first and a second multiplexer data inputs and a first multiplexer data output, wherein the first multiplexer data output is connected to the key input of the cryptographic calculating unit, the first multiplexer data input forms an end of the first data path to receive the address-dependent key obtained thereat, and the master key is present at the second multiplexer data input.

4. The apparatus of claim 1, further comprising:
a memory configured for storing the address-dependent key or an intermediate result when the access address passes through the cryptographic module,
wherein the controller is formed to skip, during a next access with a next access address, in case the next access address is identical with the access address, the first phase in the encryption during this access or to control the cryptographic module in the first phase, such that the intermediate result passes through a rest of the fist data path, to obtain the address-dependent key.

5. The apparatus of claim 1, wherein the access-address is a page address uniquely determining a memory page of the memory in which the datum to be stored is located, wherein the memory page is divided into memory blocks, and each of the memory blocks again into memory words, wherein the datum to be stored is a memory word, and wherein the memory word is uniquely indexed by a unique address, the unique address including the page address, a block address uniquely determining, together with the page address, the block to which the memory word belongs, and a word address.

6. The apparatus of claim 5, further comprising:
a masker with a first masking data input, a second masking data input, and a masking data output configured for bit-wise logically linking each bit at the first masking data input with a respective bit at the second masking data input, to obtain a masking result at the masking data output,
wherein the controller is formed to control the cryptographic module in the first phase, such that the masker is connected into the first data path with the first masking data input and the masking data output and the block address is present at the second masking data input when the page address passes through the masker.

7. An apparatus for decrypting a memory content during a read access to a memory at an access address into a decrypted datum, comprising:
a cryptographic module configured for generating an address-dependent key from the access address and configured for decrypting the memory content using the address-dependent key, wherein the cryptographic module includes a cryptographic calculating unit with a data input, a key input, and a data output configured for performing a cryptographic algorithm on data at the data input and key input, to output a cryptographic result at the data output; and
a controller configured for controlling the cryptographic module, such that in a first phase the access address passes through the cryptographic module in a first data path into which said data input and said data output of the cryptographic calculating unit are connected, and a master key is present at the key input of the cryptographic calculating unit in the first phase when the access address passes through the cryptographic calculating unit, in order to obtain the address-dependent key at an end of the first phase, and in the second phase the memory content passes through a second path into which said data input and said data output of the cryptographic calculating unit are connected, and the address-dependent key is present at the key input of the cryptographic calculating unit in the second phase when the memory content passes through the cryptographic calculating unit, so that the decrypted datum is obtained at an end of the second phase,
wherein at least one of the cryptographic module and the controller comprises a hardware implementation.

8. The apparatus of claim 7, wherein the apparatus is coupled to a data/address bus so as to obtain the access address and a datum to be stored therefrom, wherein the data/address bus is designed to transmit the access address and the datum to be stored in a temporally offset manner and in this order.

9. The apparatus of claim 7, further comprising:
a multiplexer with a first and a second multiplexer data input and a first multiplexer data output, wherein the first multiplexer data output is connected to the key input of the cryptographic calculating unit, the first multiplexer data input forms an end of the first data path to receive the address-dependent key obtained thereat, and the master key is present at the second multiplexer data input.

10. The apparatus of claim 7, further comprising:
a memory configured for storing the address-dependent key or an intermediate result when the access address passes through the cryptographic module,
wherein the controller is formed to skip, during a next access with a next access address, in case the next access address is identical with the access address, the first phase in the decryption during this access or to control the cryptographic module in the first phase, such that the intermediate result passes through a rest of the fist data path, to obtain the address-dependent key.

11. The apparatus of claim 7, wherein the access-address is a page address uniquely determining a memory page of the memory in which the memory content is located, wherein the memory page is divided into memory blocks, and each of the memory blocks again into memory words, wherein the memory content is a memory word, and wherein the memory word is uniquely indexed by a unique address, the unique address including the page address, a block address uniquely determining, together with the page address, the block to which the memory word belongs, and a word address.

12. The apparatus of claim 11, further comprising:
a masker with a first masking data input, a second masking data input, and a masking data output configured for bit-wise logically linking each bit at the first masking data input with a respective bit at the second masking data input, to obtain a masking result at the masking data output,
wherein the controller is formed to control the cryptographic module in the first phase, such that the masker is connected into the first data path with the first masking data input and the masking data output and the block address is present at the second masking data input when the page address passes through the masker.

13. A method of encrypting a datum to be stored during a write access to a memory at a memory address into an encrypted datum by means of a cryptographic module configured for generating an address-dependent key from the access address and configured for encrypting the datum to be stored using the address-dependent key, wherein the cryptographic module includes a cryptographic calculating unit with a data input, a key input, and a data output and is configured for performing a cryptographic algorithm on data at the data input and key input, to output a cryptographic result at the data output, wherein the method comprises:

controlling, performed by a controller, the cryptographic module, such that in a first phase the access address passes through the cryptographic module in a first data path into which said data input and said data output of the cryptographic calculating unit are connected, and a master key is present at the key input of the cryptographic calculating unit in the first phase when the access address passes through the cryptographic calculating unit, in order to obtain the address-dependent key at an end of the first phase; and     controlling, performed by a controller, the cryptographic module, such that in a second phase the datum to be stored passes through a second data path into which said data input and said data output of the cryptographic calculating unit are connected, and the address-dependent key is present at the key input of the cryptographic calculating unit in the second phase when the datum to be stored passes through the cryptographic calculating unit, so that the encrypted datum is obtained at an end of the second phase,     wherein at least one of the cryptographic module and the controller comprises a hardware implementation.

14. A method of decrypting a memory content during a read access to a memory at an access address into a decrypted datum by means of a cryptographic module configured for generating an address-dependent key from the access address and configured for decrypting the memory content using the address-dependent key, wherein the cryptographic module includes a cryptographic calculating unit with a data input, a key input, and a data output and is configured for performing a cryptographic algorithm on data at the data input and key input, to output a cryptographic result at the data output, wherein the method comprises:

controlling, performed by a controller, the cryptographic module, such that in a first phase the access address passes through the cryptographic module in a first data path into which said data input and said data output of the cryptographic calculating unit are connected, and a master key is present at the key input of the cryptographic calculating unit in the first phase when the access address passes through the cryptographic calculating unit, in order to obtain the address-dependent key at an end of the first phase; and     controlling, performed by a controller, the cryptographic module, such that in a second phase the memory content passes through a second path into which said data input and said data output of the cryptographic calculating unit are connected, and the address-dependent key is present at the key input of the cryptographic calculating unit in the second phase when the memory content passes through the cryptographic calculating unit, so that the decrypted datum is obtained at an end of the second phase,     wherein at least one of the cryptographic module and the controller comprises a hardware implementation.

15. A non-transitory digital storage medium having stored thereon a computer program with program code for performing, when the computer program is executed on a computer, a method of encrypting a datum to be stored during a write access to a memory at a memory address into an encrypted datum by means of a cryptographic module configured for generating an address-dependent key from the access address and configured for encrypting the datum to be stored using the address-dependent key, wherein the cryptographic module includes a cryptographic calculating unit with a data input, a key input, and a data output, configured for performing a cryptographic algorithm on data at the data input and key input, to output a cryptographic result at the data output, wherein the method comprises:

controlling the cryptographic module, such that in a first phase the access address passes through the cryptographic module in a first data path into which said data input and said data output of the cryptographic calculating unit are connected, and a master key is present at the key input of the cryptographic calculating unit in the first phase when the access address passes through the cryptographic calculating unit, in order to obtain the address-dependent key at an end of the first phase; and     controlling the cryptographic module, such that in a second phase the datum to be stored passes through a second data path into which said data input and said data output of the cryptographic calculating unit are connected, and the address-dependent key is present at the key input of the cryptographic calculating unit in the second phase when the datum to be stored passes through the cryptographic calculating unit, so that the encrypted datum is obtained at an end of the second phase.

16. A non-transitory digital storage medium having stored thereon a computer program with program code for performing, when the computer program is executed on a computer, a method of decrypting a memory content during a read access to a memory at an access address into a decrypted datum by means of a cryptographic module configured for generating an address-dependent key from the access address and configured for decrypting the memory content using the address-dependent key, wherein the cryptographic module includes a cryptographic calculating unit with a data input, a key input, and a data output and is configured for performing a cryptographic algorithm on data at the data input and key input, to output a cryptographic result at the data output, wherein the method comprises:

controlling the cryptographic module, such that in a first phase the access address passes through the cryptographic module in a first data path into which said data input and said data output of the cryptographic calculating unit are connected, and a master key is present at the key input of the cryptographic calculating unit in the first phase when the access address passes through the cryptographic calculating unit, in order to obtain the address-dependent key at an end of the first phase; and     controlling the cryptographic module, such that in a second phase the memory content passes through a second path into which said data input and said data output of the cryptographic calculating unit are connected, and the address-dependent key is present at the key input of the cryptographic calculating unit in the second phase when the memory content passes through the cryptographic calculating unit, so that the decrypted datum is obtained at an end of the second phase.

\* \* \* \* \*